3,310,523
CROSSLINKED POLYMERS AND PREPARATION OF SAME
Leandros P. Lenas, Elizabeth, N.J., assignor to Esso Research and Engineering Company, a corporation of Delaware
No Drawing. Filed Apr. 30, 1963, Ser. No. 277,005
17 Claims. (Cl. 260—41)

The present invention relates to a method of crosslinking polymers and to the cured polymers obtained. More particularly, the invention concerns crosslinking polymers made from alpha olefins with epoxidized polyolefins.

Polymers prepared solely from alpha monoolefins are essentially saturated and do not have chemical functionality. Thus, it is not possible to vulcanize these polymers with conventional curing systems utilized for unsaturation and polar polymers. Further, alpha-olefin copolymers have become of increasing interest, particularly with the introduction of the low pressure processes for their preparation. The completely saturated nature of the copolymers, however, require selected and unconventional cure systems to effect vulcanization. The conventional cure employed, i.e. the peroxide cure, occurs through a free radical mechanism and the peroxide decomposition rate (peroxide half life) generally controls the rate of cure.

In order to improve the peroxide cure, polyfunctional compounds have been used as peroxide cure activators, generally identified in the art as coagents. An example of a cure system employing a so-called coagent is peroxide employed in conjunction with sulfur which has been found by the prior art to be an effective cure system for the copolymers referred to above. Thus, in accordance with accepted mechanisms for alpha-olefin copolymer vulcanization using the peroxide-sulfur cure system, the radicals generated from the decomposition of peroxide abstract hydrogen atoms from the saturated polymer molecule. The resulting polymer radicals are either coupled to each other to form a crosslink or decompose by a chain scission reaction. Sulfur, therefore, enhances the vulcanization by participating in the crosslinking reaction and by inhibiting to some degree the chain scission reaction.

While the peroxide-sulfur cure system is a benefit to the curing of alpha-olefin copolymers, there are present certain inherent disadvantages which limit its usefulness. Odor is one such disadvantage and is caused by the organic decomposition of by-products of the peroxide and sulfur compounds used in conjunction with the peroxides. Further disadvantage resides in the adverse effect on the physical properties of the mineral filled copolymers, e.g. with respect to tear strength, compression set and stress/strain properties, which result from such use.

It has now been discovered that the foregoing difficult-to-cure substantially saturated copolymers can be crosslinked in the presence of certain epoxidized polyolefin coagents, i.e. olefinic polymers containing at least one and preferably a plurality of oxirane groups:

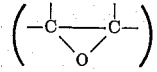

and in the presence of free-radical generating curatives. The coagents of the present invention are preferably used in conjunction with materials such as organo functional silanes, polyamines, dibasic acids and anhydrides thereof, polyphenols, Lewis-type catalysts, polymercaptans and polysulfides.

Among the epoxidized polyolefins suitable for use to crosslink copolymers in accordance with the present invention are those polymers containing one or more epoxide or oxirane groups

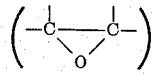

While no theoretical lower or upper limit exists for the chain length of the epoxided polyolefin, there are, however, certain practical considerations which impose a limit on the degree of epoxidation of the polyolefin curative. For example, the degree of epoxidation of the polyolefin must be considered in connection with the effectiveness of the curative and in the properties desired in the resulting crosslinked product. A highly expoxidized olefin polymer curing agent will produce a crosslinked product of somewhat different properties than would be obtained by the use of a curative of a lower degree of epoxidation.

The choice of the epoxidized polymer is obviously important. Preferred polymers are those of butadiene, the copolymers of butadiene with monoolefins, such as butene, styrene, substituted styrene, nitriles, such as acrylonitrile, methacrylonitrile, esters of acrylic and methacrylic acid, and the like, especially where the monoolefin forms a minor part of the polymer. Other diolefins, such as isoprene, piperylene, etc. may be used in lieu of butadiene. In general, the polymers of low to moderate molecular weight having a substantial proportion of the unsaturated carbon-to-carbon bonds oxidized to epoxide groups are useful.

Especially preferred for use as curing coagents in accordance with the present invention are epoxidized butadiene copolymers. The butadiene copolymers comprise the conjugated dienes, for example, butadiene and isoprene, as well as alkyl substitution products thereof, copolymerized with a substituted ethylene monomer containing the

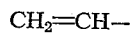

group, for example styrene and acrylonitrile among others. These polyepoxides are well known in the art. Both resinous and nonresinous polyepoxides may be used. In the examples, reference will be had to Oxiron 2002 resins, polyfunctional resinous products manufactured by Food Machinery and Chemical Corporation, known to contain the structural formula:

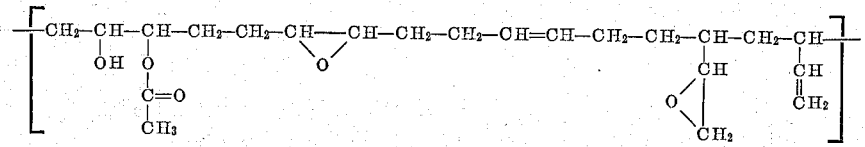

The properties of these resinous epoxides, which may be used in carrying out the present invention, are given in the following table:

| Oxiron | 2000 | 2001 | 2002 |
|---|---|---|---|
| Viscosity, poise at 25° C | 1,800 | 160 | 15 |
| Active Ingredients, percent | 100 | 100 | 100 |
| Specific Gravity | 1.010 | 1.014 | 0.985 |
| Epoxy, percent | 9.0 | 11.0 | 6.9 |
| Epoxy equivalent [1] | 177 | 145 | 232 |
| Hydroxyl, percent | 2.5 | 2.0 | 1.9 |
| Iodine Number | 185 | 154 | |

[1] Number of grams of resin containing 1 gram mole of epoxide.

As mentioned above, curing adjuvants, such as amino silanes, amine acids, polyamines, dibasic acids and anhydrides, polyphenols, Lewis-type catalysts, polymercaptans and polysulfides can be employed in conjunction with the epoxidized polyolefin curing agent. In general, the amount of the aforementioned substances used in combination with the novel curing coagents will range from about 0.05 to 20 parts by weight per 100 parts by weight of polymer (php.) and preferably about 0.5 to 5 php.

Particularly useful as adjuvants are the organo functional silanes, that is, organosilanes containing functional groups, for example an amino ($-NH_2$) or carbethoxy ($-COOC_2H_5$) radical attached to the terminal carbon of the silicon-carbon side chain. Amino modified silanes are preferred in the practice of the present invention with gamma aminopropyltriethoxysilane and deltaaminobutylmethyldiethoxysilane and gamma aminobutyltriethoxysilane being especially preferred.

Adjuvants also preferred are amines and polyamines; in particular, any diamine, triamine, and higher polyamine having one or more of the following types of amino groups; (a) unsubstituted amino groups, (b) monosubstituted amino groups, (c) di-substituted amino groups, and (d) heterocyclic amines such as pyridine. The substituents on the mono-and di-substituted amino groups are one or more of alkyl, aryl and heterocyclic groups. An added advantage in using these polyamines is that they not only effectively produce the cured copolymers of the invention but they also act as antioxidants and stabilizers.

Suitable dibasic acids for use as adjuvants in the present invention are saturated or unsaturated dicarboxylic acids or anhydrides. Examples of acids are: adipic, fumaric, maleic, malic, oxalic, sebacic, tartaric and the like. Examples of anhydrides which may be used are: maleic, succinic, phthalic, tetrahydrophthalic and the like.

Polyphenols suitable for use include catechol resorcinol, 2,5-di(t-amyl)hydroquinone, 4,4'-thiobis-(6-t-butyl-m-cresol).

Lewis-type catalyst suitable for use include aluminum chloride, stannous chloride, ferric chloride. Polymercaptans suitable for use include glycol dimercapto-acetate, 1,5-pentanedithiol.

Polysulfides suitable for use include butyl disulfide, phenyl disulfide, t-butyl trisulfide.

It is also advantageous to use about 0.1 to 15 parts by weight php. of various metal compounds in conjunction with the epoxidized polyolefin curing agent. Among the metal compounds that can be used are halides, oxides, sulfides, and organic acid salts of metals in Groups II, III, IV and VIII in the Periodic Chart of Elements shown on pages 56 and 57 of Lange's Handbook of Chemistry, 8th edition. Examples of suitable metal compounds that may be employed in this invention are metal salts of organic carboxylic, sulfonic, and sulfinic acids, zinc oxide, calcium oxide, aluminum oxide, aluminum alkoxides, iron oxide, barium oxide, zinc chloride, magnesium sulfide, lead oxides, silicon dioxide and cadmium oxide. Of the foregoing, zinc oxide is especially useful. An outstanding combination of curing components is bis-(perchloroalkyl)sulfone, sulfur and zinc oxide.

A wide variety of inorganic fillers, including such things as carbon blacks, clays and whitings, may be used as desired in order to impart certain characteristics to the cured polymer. When fillers are used, it is generally best to employ reinforcing furnace blacks and channel blacks, such as HAF carbon black, SRF carbon black and EPC carbon black. The amount of filler used in compounding the polymer prior to vulcanization can vary from as little as 1 part by weight php. to 200 parts by weight php. For most purposes, about 10 to 70 parts by weight of filler php. is used in conventionally loaded polymers.

In the practice of the present invention it was found to be advantageous to premix the curing agent, either alone or with other curing substances, such as aminosilanes, with a finely divided filler or pigment. For example, a part or all of the filler, such as carbon black or particulate clay, to be used in the polymer product can be premixed with the epoxidized polyolefin curing agent and the mixture is added to the polymer in the conventional manner. For most purposes, one should use at least 1 part by weight of filler per part by weight of the epoxidized curing agent. For best results, it will be found that a premix comprising about 2 to 50 parts by weight of filler per part by weight epoxidized curing agent is efficaceous. Of course, any other solid having a large surface area can be used in lieu of or in combination with the conventional fillers mentioned above.

In addition to the above-mentioned materials, other substances that are frequently admixed with curable solid polymers, including antioxidants, processing oils and pigments, may be blended with the polymer prior to curing it in accordance with the present invention.

The amount of epoxidized polyolefin curing agent used will depend to a large extent upon the characteristics of the polymer and the properties desired in the vulcanized product. In general, it will be found that a relatively small amount of the curing agent will produce vulcanizates having useful properties. While as little as 0.1 part per hundred parts by weight of polymer can be employed, it is generally necessary to use at least 2 parts per hundred parts by weight of polymers in order to effect a cure in less than an hour. For economic reasons, it is not practical to utilize more than about 40 parts of the curative per hundred parts by weight of polymer; and, as a practical matter, it will be found that the best results are gotten with amounts of 2 to 10 parts of the curative per hundred parts by weight of the polymer.

In curing polymers, the epoxidized polyolefin curative is thoroughly admixed with the polymer, which may or may not be already compounded with chemicals having vulcanizing properties, and fillers such as acidic mineral fillers, etc. The mixing may be effected either on a mill or in a Banbury mixer. The compounded polymer is then heated to an elevated temperature until the desired crosslink density is obtained. While crosslinkages will form over a long period of time, e.g. up to 10 hours, at relatively low temperatures, it is advisable to vulcanize at temperatures above 200° F. in order to keep the cure time to a minimum. The upper vulcanization temperature will be dictated mainly by the concentration of the curative, the contact or cure time and the effect of higher temperatures on the properties of the polymer. For most saturated hydrocarbon polymers, the vulcanization temperatures can, but need not, exceed 450° F. as in continuous vulcanizations with short contact times, or with plastics; and it is usually preferred to carry out the crosslinking step at temperatures between about 250° and 350° F. at pressures ranging from substantially atmospheric up to 250 p.s.i.g. for about 1 to 60 minutes or until the tensile strength of the polymer is increased at least 100%, and preferably at least 1000%.

While a wide variety of substantially saturated polymers may be cured in accordance with the present invention, the novel curing coagents have special application to substantially saturated hydrocarbon polymers made from alpha monoolefins containing 2 to 6 carbon atoms, e.g. polymers containing at least 30 mole percent combined ethylene. The polyolefins may be highly crystalline in nature or they may be substantially amorphous, i.e. having a crystallinity less than about 5%. Because it has been particularly difficult to effectively crosslink copolymers of ethylene and higher alpha olefins, such as propylene, butene-1 and pentene-1, this process is particularly useful for these copolymers.

Crystalline homopolymers of alpha olefins, e.g. ethylene and propylene, can be prepared in accordance with well-known methods, such as described in Belgian Patents 533,362 and 538,782, as well as in Chemical and Engineering News, Apr. 8, 1957, pages 12–16. These linear polyolefins usually have a crystallinity of at least 20% and often have a crystallinity of 70% or higher. Their viscosity average molecular weights, using the Moraglio method referred to below, is in the range of 10,000 to 500,000 or higher. Their densities are usually between about 0.85 and 0.95.

The rubbery copolymers to which this invention has particular application can be prepared by interpolymerizing the olefin monomers in the presence of solid and liquid catalysts obtained by partially reducing a heavy metal compound, such as halide of a metal selected from Groups IV–B, V–B and VI–B of the Periodic Chart of Elements. Especially useful are vanadium tetrachloride, vanadium oxychloride and titanium trichloride. The metal halide, e.g. vanadium tetrachloride, is activated with an alkyl aluminum compound corresponding to the formula RR'A1X. In this formula, R, R' and X preferably are alkyl groups of 2 to 8 carbon atoms, although X may alternatively by hydrogen or halogen, notably chlorine. Representative of the aluminum alkyl compounds that can be used are aluminum triethyl, aluminum diethyl chloride, aluminum sesquichloride, aluminum triisobutyl, etc.

For example, ethylene and propylene are simultaneously contacted with vanadium tetrachloride and an activator such as aluminum triethyl in the presence of inert hydrocarbon solvents, e.g. isopentane, n-heptane or xylene, and the polymerization is conveniently effected at temperatures of about $-20°$ to $212°$ F. and pressures ranging from about 0 to 500 p.s.i.g., usually 0 to 100 p.s.i.g. The catalyst concentration in the polymerization zone is preferably in the range of about 0.001% to 0.5% based on the total liquid, and the polymer product concentration in the polymerization zone is preferably kept between about 2 to 15% based on total contents, so as to allow easy handling of the polymerization mixture. The proper polymer concentration can be obtained by having enough of the inert diluent present or by stopping the polymerization short of 100% conversion. When the desired degree of polymerization has been reached, a $C_1$ to $C_8$ alkanol, such as methanol, isopropyl alcohol or n-butyl alcohol, is normally added to the reaction mixture for the purpose of dissolving and deactivating the catalyst and, in some instances, to precipitate the polymer product from solution. After filtration, the solid polymer may be further washed with alcohol or acid such as hydrochloric acid and dried. Alternatively, the crude polymer product may be recovered by flashing the diluent from the mixture.

Ethylene propylene copolymers in general have a molecular weight of 25,000 to 1,000,000 as determined from viscosity measurements in tetralin solution, according to the method published by G. Moraglio, La Chimica e l'Industria, volume 41, page 984, 1959, and the amount of ethylene in the copolymers can range from 10 to 99 mole percent, but preferably from 30 to 85 mole percent or about 20 to 79 wt. percent. The copolymers are further characterized by the following properties: densities ranging from 0.85 to 0.90; percentage by weight insoluble in normally heptane at room temperature, ranging from 10% to 40% and in some instances up to 90%; and crystallinity content, as determined by X-ray diffraction, ranging from 0% to 15%. The exact values of these physical characteristics depend on the particular composition of the copolymer, and the conditions of synthesis and the catalyst used.

In addition to the saturated hydrocarbon polymers described above, other alpha olefin polymers which contain small amounts, e.g. 0.1 to 5 mole percent, of $C_8$ to $C_{10}$ cyclic monomers, such as ethylene-propylene-dicyclopentadiene terpolymer, ethylene-propylene-methylene norbornene terpolymer, and ethylene-propylene-tetrahydroindene terpolymer, can also be cured in accordance with the present invention, either alone or in admixture with the saturated polymers described above.

The vulcanized polymers prepared in accordance with the present invention may be used in a number of applications, including tires, wire coatings, pipe, footwear, channel stocks, as an undercoater for metals, and for other applications for which a stock with a high modulus, high tensile, as high tear strength, and a good ozone resistance is required. These products have a wide application because the vulcanizate is essentially odorless.

The invention and its advantages will be better understood by reference to the following examples.

*Example 1*

A test was run comparing the effectiveness of the claimed invention with the results obtained with a peroxide cure.

An ethylene propylene elastomer containing 43 wt. percent ethylene and the balance propylene having a specific gravity of 0.86, a Mooney viscosity (8 minutes at 212° F.) of 40 and a heptane insolubility of 5% was compounded on a rubber mill in accordance with the following recipes:

| Ingredients | Parts by Weight | |
|---|---|---|
| Ethylene propylene rubber | 100 | 100 |
| SRF Black | 60 | 60 |
| Oxiron 2002 | | 5 |
| 40% dicumyl peroxide (on inert filler) | 6.75 | 6.75 |

The resulting mixtures were each cured at 300° F. for 20 minutes. The results are set forth in Table I.

TABLE I

| Property | Process | |
|---|---|---|
| | Control | Present Invention |
| Tensile, p.s.i. | 930 | 1,740 |
| Elongation, percent | 655 | 515 |
| 300% Modulus | 370 | 890 |
| Shore A Hardness | 56 | 60 |
| Odor | Poor | Fair |

The above results show the satisfactory properties of the products of this invention and the superior properties as compared to the prior art.

Example 2

The efficacy of the curing coagents of this invention as well as adjuvants used therewith on ethylene-propylene rubbers similar to those of Example 1 is shown below in Table II.

TABLE II

| Run No | 1 | 2 | 3 | 4 | 5 | 6 | 7 |
|---|---|---|---|---|---|---|---|
| Ethylene-Propylene Rubber | 100 | 100 | 100 | 100 | 100 | 100 | 100 |
| HiSil 233 [1] | 60 | 60 | 60 | 60 | 60 | 60 | 60 |
| SRF Black | | | | | | | |
| Oxiron 2002 | | | 3 | 5 | 5 | 5 | 5 |
| Maleic Acid | | | | | | 1.5 | 1.5 |
| Maleic Anhydride | | | | | 1.5 | | |
| Zinc Oxide | 5 | 5 | 5 | 5 | 5 | 5 | 5 |
| Di-Cup 40C [2] | 6.75 | 6.75 | 6.75 | 6.75 | 6.75 | 6.75 | 6.75 |
| Sulfur | .32 | | | | | | .32 |
| Cure Temp., °F | 320 | 320 | 320 | 320 | 320 | 320 | 320 |
| Cure Time, min | 20 | 20 | 20 | 20 | 20 | 20 | 20 |
| Tensile, p.s.i | 1,900 | 2,030 | 2,550 | 2,430 | 2,280 | 2,200 | 2,200 |
| Elongation, percent | 900 | 810 | 550 | 564 | 415 | 420 | 900 |
| 300% Modulus | 360 | 470 | 1,010 | 1,135 | 1,450 | 1,370 | 370 |
| Shore A Hardness | | 85 | 81 | 80 | 82 | 84 | 75 |
| Odor [3] | (4) | (5) | (5) | (5) | (5) | (5) | (4) |

[1] Precipitated hydrated silica.
[2] 40% dicumyl peroxide on inert filler.
[3] Acetophenone-like
[4] Very poor.
[5] Fair.

The above results show the advantages accruing from the use of an epoxidized curing coagent and adjuvants on the physical properties of the copolymer. This table also shows the deleterious effect of sulfur on both the physical properties and odor.

Example 3

The following example shows the effect of epoxidized polyolefin and amino silane in Dixie Clay filled ethylene propylene rubber cures. The data resulting are shown below in Table III.

TABLE III

| Run No | 1 | 2 | 3 | 4 |
|---|---|---|---|---|
| Ethylene-Propylene Rubber | 100 | 100 | 100 | 100 |
| Dixie Clay, phr | 100 | 100 | 100 | 100 |
| Di-Cup 40C [1] | 6.75 | 6.75 | 4 | 4 |
| Sulfur | 0.32 | | | |
| Oxiron 2002 | | 10 | | 5 |
| Buton 150 [2] | | | 5 | |
| Amino Silane, A1100 [3] | | 1 | 1 | 1 |
| Cure Temp., °F/time, min | 320/20 | 320/20 | 320/20 | 320/20 |
| Tensile, p.s.i | | 1,560 | 100 | 730 |
| Elongation, percent | No | 243 | 400 | 460 |
| 300% Modulus | | 1,420 (200%) | | 575 |
| Shore A Hardness | Cure | 76 | 59 | 69 |
| Odor | | Fair | Poor | Fair |

[1] 40% dicumyl peroxide on inert filler.
[2] Viscous polybutadiene resin.
[3] Gamma-amino-propyltriethoxysilane.

The above results show that Dixie Clay filled ethylene-propylene rubber cannot be cured with a conventional peroxide-sulfur curative while an excellent cure was obtained by the practice of the present invention.

Example 4

The following example illustrates the superiority of epoxidized polyolefins over unmodified polyolefins in crosslinking ethylene-propylene rubbers. The results are tabulated below in Table IV.

TABLE IV

| Run No | 1 | 2 | 3 | 4 | 6 | 7 | 9 |
|---|---|---|---|---|---|---|---|
| Ethylene-Propylene Rubber | 100 | 100 | 100 | 100 | 100 | 100 | 100 |
| HiSil 233 [1] | 60 | 60 | 60 | 60 | 60 | 60 | 60 |
| Zinc Oxide | 5 | 5 | 5 | 5 | 5 | 5 | 5 |
| Di-Cup 40C [2] | 6.75 | 6.75 | 6.75 | 6.75 | 6.75 | 6.75 | 6.75 |
| Oxiron 2002 | 3 | | | | | | |
| Buton 100 [3] | | 3 | | | | | |
| Buton 500 [3] | | | 3 | | | | |
| Buton 300 (powdered) [4] | | | | 3 | | | |
| 1,2 polybutadiene | | | | | 3 | | |
| Epoxidized 1,2 polybutadiene (3 epoxies/chain) | | | | | | 3 | |
| Sulfur | | | | | | | 0.32 |
| Cure Temp., °F/time, min | 320/20 | 320/20 | 320/20 | 320/20 | 320/20 | 320/20 | 320/20 |
| Tensile, p.s.i | 2,370 | 1,930 | 1,940 | 2,060 | 1,925 | 2,370 | 2,050 |
| Elongation, percent | 450 | 765 | 745 | 570 | 750 | 465 | 900 |
| 300% Modulus | 1,330 | 580 | 625 | 1,000 | 660 | 1,280 | 450 |
| Shore A Hardness | 74 | 74 | 75 | 77 | 77 | 78 | 73 |

[1] Precipitated hydrated silica.
[2] 40% dicumyl peroxide on inert filler.
[3] Unmodified polybutadiene resin.
[4] Oxidized copolymer of butadiene and styrene.

It is to be understood that this invention is not limited to the specific examples which have been offered merely as illustrations, and that modifications may be made without departing from the spirit of the invention.

As used herein the term "free radical generating compound" refers to conventional free radical generators well known to the art. The preferred free radical generators which may be incorporated with the copolymers are organic peroxides. Representative examples are bis-(alpha, alpha-dimethylbenzyl) peroxide, dibenzoyl peroxide, di-tert.-butyl peroxide, tert.-butyl perbenzoate and di-N-methyl tert.-butyl percarbamate. Bis(alpha, alpha-dimethylbenzyl) peroxide, often called dicumyl peroxide is particularly preferred. About 1 to about 10 parts by weight php. are found to be effective, although the amount of generating compound utilized is not particularly critical.

As many widely different embodiments of this invention may be made without departing from the spirit and scope thereof, it is to be understood that this invention is not limited to the specific embodiments thereof except as defined in the appended claims.

What is claimed is:

1. A method of crosslinking a hydrocarbon polymer selected from the group consisting of substantially saturated $C_2$–$C_6$ alpha olefinic homopolymers, substantially saturated $C_2$–$C_6$ alpha olefinic copolymers and terpolymers prepared from $C_2$–$C_6$ alpha olefins and a $C_8$–$C_{10}$ cyclic monomer which comprises mixing said polymer with (a) a crosslinking compound comprising an epoxidized polyolefin containing at least one oxirane group:

$$\left(-\underset{}{\overset{|}{C}}\underset{O}{\diagup\diagdown}\overset{|}{\underset{}{C}}-\right)$$

and (b) a free radical generating compound, and heating said mixture until crosslinkages are formed in the polymer.

2. The method of claim 1 in which the crosslinking compound is an epoxidized butadiene polymer.

3. The method of claim 1 in which the hydrocarbon polymer is an elastomeric copolymer of ethylene and a $C_3$–$C_6$ alpha monoolefin.

4. The method of claim 1 in which the polymer is admixed with a filler before it is heated in the presence of the crosslinking compound.

5. The method of claim 1 in which the crosslinking compound is an epoxidized butadiene copolymer and it is mixed with an adjuvant before it is mixed with the polymer.

6. A method of crosslinking ethylene-propylene rubber which comprises mixing said rubber with (a) small amounts of a crosslinking compound having the general formula

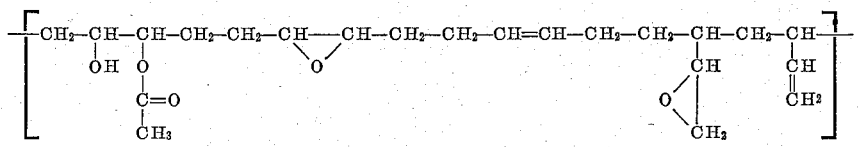

(b) a free radical generating compound and (c) an adjuvant comprising an aminosilane and heating the resulting mixture until crosslinkages are formed in the polymer.

7. The method of claim 6 in which a metal oxide is mixed with the rubber prior to heating the mixture.

8. A method of crosslinking a homopolymer of $C_2$ and $C_3$ alpha olefins which comprises mixing said homopolymer with (a) small amounts of a compound comprising epoxidized 1,2 polybutadiene having at least 3 epoxide groups per chain, (b) zinc oxide, (c) a free radical generating compound, and heating the resulting mixture until the homopolymer contains crosslinkages.

9. A composition comprising a hydrocarbon polymer selected from the group consisting of substantially saturated $C_2$–$C_6$ alpha olefinic homopolymers, substantially saturated $C_2$–$C_6$ alpha olefinic copolymers and terpolymers prepared from $C_2$–$C_6$ alpha olefins and a $C_8$–$C_{10}$ cyclic monomer and an epoxidized polyolefin containing at least one oxirane ring:

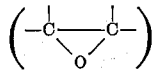

10. The composition of claim 9 in which the hydrocarbon polymer is an elastomeric copolymer of ethylene and a $C_3$–$C_6$ alpha monoolefin and the composition contains a metal oxide.

11. The composition of claim 9 in which the hydrocarbon polymer is ethylene-propylene rubber and the composition contains an aminosilane.

12. A composition comprising (a) ethylene-propylene rubber, (b) from about 0.1 to 40 parts by weight of an epoxidized polyolefin having the formula

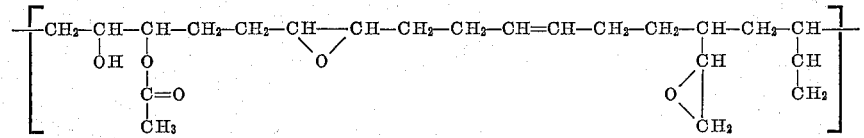

per 100 parts by weight of said rubber and (c) a free radical generating compound.

13. The composition of claim 12 in which from 0.05 to 20 parts by weight, per hundred parts by weight of said rubber, of an amino silane adjuvant is incorporated therein.

14. The composition of claim 12 in which from 0.01 to 15 parts by weight, per hundred parts by weight of said rubber, of a metal oxide is incorporated therein.

15. The composition of claim 12 in which from 1 to 200 parts by weight, per hundred parts by weight of said rubber, of a filler chosen from the group consisting of carbon black and particulate clay is incorporated therein.

16. Ethylene-propylene rubber vulcanized with

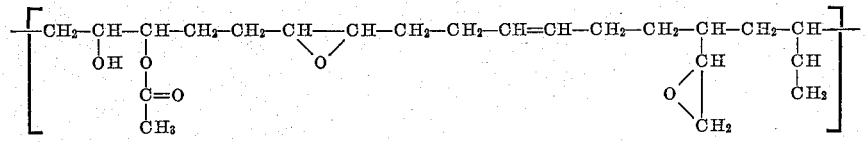

and a free radial generating compound.

17. Ethylene-propylene rubber vulcanized with (a) epoxidized 1,2 polybutadiene wherein said epoxidized polymer contains at least 1 epoxide group per chain prior to vulcanization and (b) a free radical generating compound.

No references cited.

MORRIS LIEBMAN, *Primary Examiner.*

J. S. WALDRON, *Assistant Examiner.*